Sept. 26, 1967  J. J. SIEGEL ETAL  3,343,718
METHOD OF FORMING AND DISPENSING AEROSOL DISPENSIBLE
POLYMERIZABLE COMPOSITIONS
Filed April 6, 1965
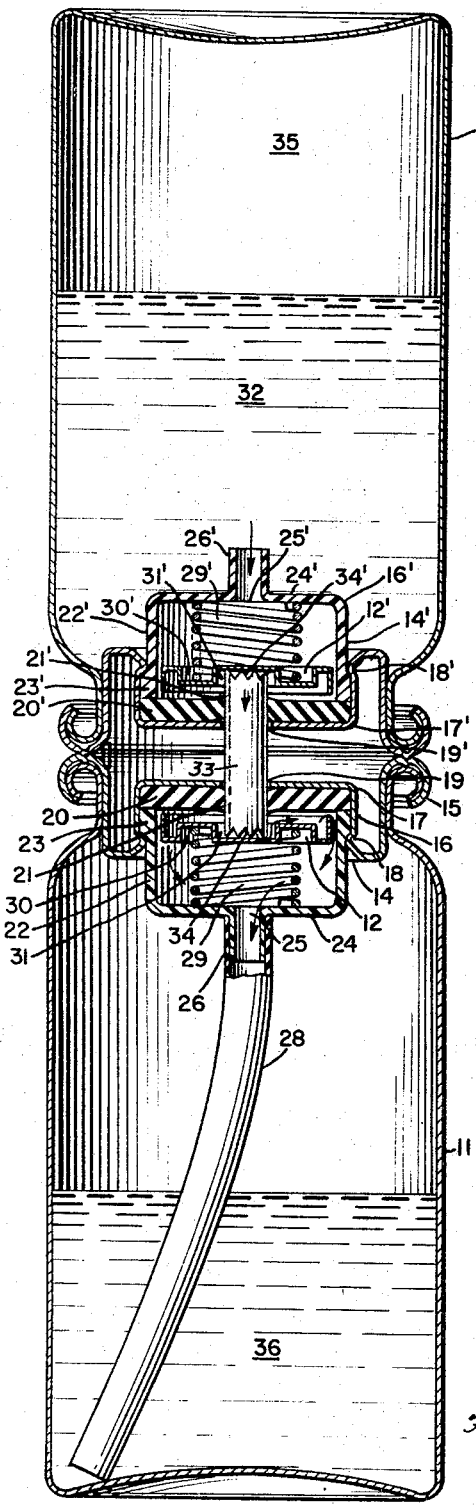
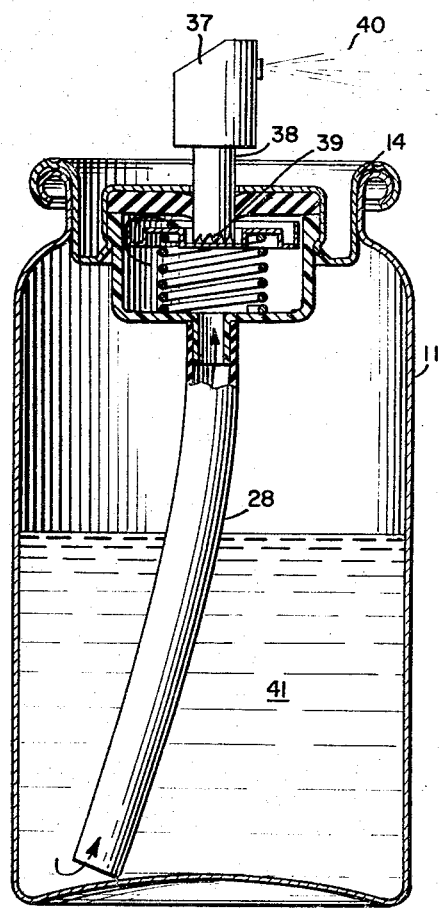
Inventors
Jerome J. Siegel
Seymour Leavitt
By Dressler, Goldsmith, Clement & Gordon
Attorneys

United States Patent Office 3,343,718
Patented Sept. 26, 1967

3,343,718
METHOD OF FORMING AND DISPENSING AEROSOL DISPENSIBLE POLYMERIZABLE COMPOSITIONS
Jerome J. Siegel and Seymour Leavitt, Lincolnwood, Ill., assignors to Capitol Packaging Co., a corporation of Illinois
Filed Apr. 6, 1965, Ser. No. 446,125
12 Claims. (Cl. 222—1)

This invention relates to polymerizable compositions. More particularly, it relates to sprayable coating compositions having a polymerizable base. Still more particularly, it relates to self-propelled polymerizable resin compositions and containers which are particularly adapted for dispensing polymerizable matter as a spray, foam or semi-solid to an intended substrate.

Briefly, the method for handling polymerizable compositions comprises establishing two separated systems with the polymerizable material in one system and the polymerization catalyst in the other system, the material to be transferred from one system and combined with the material of the other system being under a higher pressure, transferring the contents of the higher pressurized system to the dispensing package whereby a resultant composition of matter is formed under conditions which provide control of polymerization, and dispensing the resultant composition over a period which will be less than twenty-four hours following combining of the contents of the systems.

It has been common practice to dispense shaving creams, insecticidal compositions, paints, and the like, by conventional self-contained propellant-product combinations. The various products to be dispensed are mixed with and/or dissolved in gaseous mediums or liquefied propellants.

Propellant-product mixtures capable of being dispensed in aerosol form must be carefully formulated so that they represent balance of properties dictated by the requirements of the container and properties desirable in the product.

In addition to the general problems associated with self-propelled products heretofore available commercially, specific applications have presented problems of a unique nature. Reactive polymerization or partially polymerized resin matter, when dispensed at atmospheric ambient conditions in the absence of a chemical catalyst, are dependent upon relative humidity, oxidation, light, for example, ultraviolet light, or heat to effect a cure, all of which, except heating or baking, effect a slow cure. Baking requires expensive equipment as well as skilled artisans. The other procedures are so slow in curing as to be impractical for most factory, shop or home uses.

Chemical catalysts for the polymerization reaction accelerate the curing of polymerizable materials to a solid tack-free finish. But, once any appreciable quantity of the chemical catalyst is added to polymerizable materials, the reaction converts the monomer or partial polymerized material to a viscous fluid or solid of such character that aerosol dispensing is not possible after a short period. This curing has varied so in time, i.e., setting up to a mass too heavy to dispense through ordinary spray valves that aerosol dispensing of catalyst-containing polymerizable material has heretofore been impractical. To avoid the problem of pre-polymerization of, for example, epoxy resins, two-can non-pressurized systems have been used. The contents of these containers are intimately mixed in air shortly before use, transferred to an air spray gun and dispensed. The spray gun and compressor are expensive as well as is labor for the necessary disassembly and cleaning after use. This invention provides for an inexpensive disposable means of application of a polymerizable composition.

Now it has been discovered that the polymerizable materials, such as the polyether, polyester, etc., resins, can be handled as aerosol dispensible compositions which require no extra devices other than aerosol type valves, standard containers and propellants selected from the types readily available commercially, wherein the resin is in solution, emulsion or dispersion form in a propellant composition with or without auxiliary solvent and mixing is effected while excluding oxygen and/or moisture so that an accurate predictable polymerization period, based on quantity of catalyst intermixed, can be established.

Apparatus for handling the two pressurized systems involves so-called "mother and daughter" containers with valves of a type such that transfer of the contents of the higher pressure container to the lower pressure container can be effected. A typical valve arrangement for the containers is one in which a valve is provided for the dispensing container actuatable by an insertable conventional tip. Such a dispensing container will have as a companion container one using a stem or delivery tip adapted for mass transfer which fits into the valve of a dispensing container so that by forcing the two containers together the valves on each container will open and transfer of the contained composition takes place. After transfer, the containers are separated, and a conventional button or actuator which incorporates the spray orifice or delivery nozzle is emplaced on the dispensing container.

The self-propelling compositions of this invention which are to be dispensed comprise as basic constituents reactive polymerizable or partially polymerized matter with or without a solvent for said matter, if such is necessary, a liquid propellant or propellant mixture compatible with the resin and/or any solvent solution thereof and a curing catalyst.

In addition, the compositions may contain supplemental material, such as dyes, pigments, chromatophoric material, latent catalysts, vapor suppressors, coupling agents, fillers, detergents, plasticizers, waxes, etc., mixed to adapt compositions to specific end uses.

The compositions of this invention, at the time of dispensing, will contain amounts of catalysts to effect a cure at ambient temperatures varying from a period of a few minutes to a number of hours. Under such circumstances, the polymerizable material and catalysts must be maintained as separated pressurized systems until shortly before use. Either basic constituent, i.e., the polymerizable material, or the catalyst, may be stored in the container adapted by virtue of higher pressure to transfer material to the composition dispensing container. Other constituents may be distributed between the two pressure systems, as desired.

In order to effect transfer of all or any part of the material from one system to the other, it is necessary that there be a pressure differential between the systems. The system containing the resultant composition of matter plus propellants becomes the dispensing package by simply inserting an aerosol actuator into the valve. Generally, it is preferable to incorporate polymerizable material in a lower pressure system and to incorporate the catalyst in a higher pressure system so that upon transfer there will be an intimate mixing of the two, although materials may be interchanged at the option of the formulator.

The higher pressure system may contain a hydrocarbon or fluorocarbon liquefied gas or mixtures thereof as the propellant. It may also contain compressible gas such as nitrogen, nitrous oxide, carbon dioxide, and the like, and where oxidation is no problem, oxygen and air, the compressible gas being specifically introduced so as to safely raise the pressure of a commercial aerosol container to between 80 and 100 pounds p.s.i.g. These gases at the higher pressures increase the speed and completeness of transfer, aid the intermixing of the composition and constituents and purge the recipient dip tube of reactant materials. If the higher pressure system contains a catalyst and/or an accelerator, these materials may be present in solution form in the liquefied gas and/or in an auxiliary solvent or in emulsion form or as a dispersion.

Generally speaking, useful propellant constituents of the composition exist as a gas at ordinary room temperatures and atmospheric pressure and exist largely as a liquid at super-atmospheric pressures and low temperatures. Relatively water-insoluble, saturated aliphatic hydrocarbons and partially halogenated hydrocarbons having vapor pressure in the range between 5 pounds to about 200 pounds p.s.i. gauge at 70° F., and preferably in the range between about 20 pounds and 75 pounds p.s.i. gauge possess these properties. Materials exerting these vapor pressures can be balanced or combined with vapor suppressors so as to obtain a final pressure in dispensing containers in the range between about 20 and about 100 pounds p.s.i. gauge. For households wherein the safety of an amateur is a consideration, it is preferable that the dispensing container have a pressure in the range between about 20 and about 50 pounds p.s.i. gauge. The propellant may be formed of one or more such compounds which, although the individual propellants may have vapor pressure outside the desired range, have, when combined, a vapor pressure within the stated ranges.

Straight chain saturated aliphatic hydrocarbons having vapor pressure suitable for the purpose are propane, butane, isobutane, and cyclobutane. Other propellants useful alone, or in admixture with other propellants, are the saturated fluorinated or chlorinated or chlorfluorinated hydrocarbons, for example, the substantially water insoluble halogenated alkanes having not more than two carbon atoms and at least one fluorine such as 1,1 -difluorethane, 1-monochlor-1,2-difluorethane, monofluortrichlormethane, dichlordifluormethane, 1,2 - dichlor 1,1,2,2-tetrafluorethane, and the like.

Compressible and liquefiable gases useful for the purposes of this invention are:

Ammonia
Butane
Butadiene
Butylene
Carbon dioxide
Carbon monoxide
Chlorine
Cyclopropane
Dichlorodifluoromethane
Difluoroethane
Difluoropropylene
Dimethylether
Ethylene oxide
Ethylene chloride
Iso-butane
Methyl chloride
Monochlorodifluormethane
Nitrogen
Nitrous oxide
Oxygen
Propane
Propylene
Propylene oxide
Trifluorethane
Trifluormethane
Vinyl chloride, etc.

It will be recognized by those skilled in the art that various gases are not compatible with all types of polymerizable material, for example, polar materials have limited tolerance for non-polar materials. Thus, non-polar fluorocarbon liquefied gases if present in too high a concentration cause polar resins such as epoxide resins to drop out of solution. A satisfactory propellant combination for epoxide resins is one containing approximately 50% of hydrocarbon and 50% of Freon.

It will also be recognized that one or both of the containers may be under pressure. For example, the dispensing container may contain no propellant or a propellant capable of maintaining a lower pressure than will be maintained in the container whose contents will be transferred to the dispensing container.

The following list of catalysts for the curing of various polymerizable materials is given to illustrate operable combinations without any intention that the invention be limited thereto:

| Resin: | Catalyst: |
|---|---|
| Epoxide | Aliphatic polyenes, such as tetraethylene pentamine, diethylenetriamine, ethylenediamine. |
| Acrylic, vinyl, alkyd, and glycol polyester | Organic peroxides, metal mercaptides and napthenates, quaternary ammonium compounds, amines, etc., singly or in admixture. |
| Urea formaldehyde | Inorganic curing agents such as ammonium salts. |

The type of liquefied gas used in the container holding the polymerization base or resin is subject to more stringent specifications than that used in the companion container. The gas used in the container holding polymerizable base must be of a type to have sufficient solvency power to hold the polymerizable material in solution both initially and when diluted by the liquefiable gas of the companion container at the time of transfer if the transfer gas mixture has low solvency power. The solvency problem may be illustrated with reference to epoxy resins. Epoxy resins, such as the "Epon" resins sold by Shell Chemical Co., are 100% soluble in liquefiable hydrocarbons such as isobutane, but are only poorly soluble in, for example, the fluorocarbon, dichlorodifluormethane (Freon 12). Mixtures of hydrocarbons and fluorocarbons in proportions of 50 to 60% fluorocarbons generally have useful solvency characteristics for the epoxy resin. Improvement in the solvent power for resins of fluorocarbons may be effected by the presence of methylene chloride.

Useful epoxy resins are the glycidyl ethers or glycidyl esters, preferably with 1 to 2 glycidyl groups per polyepoxide molecule. The polyepoxide may be a fatty acid epoxide produced by the action of an epoxidizing agent, such as peracetic acid, or an unsaturated fatty ester of a polyhydric alcohol. Another useful form of epoxy resin is the polyether, such as the glycidyl ether of a polyhydric material, such as bisphenol, pentaerythritol, etc.

Other forms of polymerizable materials which can be dispensed are those subject to free radical polymerization using catalysts, such as benzoyl peroxide. Suitable other resins are acrylic resins using a "chain stopping" solvent to limit the polymerization and achieve a high solids solvent solution of sprayable viscosity, styrene polymers, vinyl polymers, alkyd resins, glycol polyesters, ureaformaldehyde resin, etc.

It will be understood, of course, that dispensable coating compositions may contain one or more polymerizable materials, for example, an epoxy resin soluble in, for example, butanol may be present in admixture with an alcohol soluble melamine or urea-formaldehyde resin, etc.

The viscosity of the ultimate composition to spray properly must be in the range between about 13 to 14 seconds as a minimum and about 30 seconds as a maximum, as measured by a No. 4 Ford Cup. A, for example, finished composition of 30 seconds viscosity is so viscous as to prevent proper dispensing of a spray coating when maintained at the maximum legal gas pressure for low pressure containers, i.e., about 40 pounds. The permissible viscosities, it will be recognized, will vary depending upon maximum legal gas pressure, and upon the valve orifice size and the container pressure specification.

The apparatus useful in carrying out the invention is schematically presented in the accompanying drawing in which:

FIGURE 1 shows the containers when transfer of contents is being effected; and

FIGURE 2 shows the dispensing container with dispensing valve in place.

Referring to FIGURE 1 of the drawings, an aerosol container 10 is shown mounted on a second aerosol container 11. Each of said containers 10 and 11 is provided with similar valves 12 and 12'.

Container 11 is provided with a mounting cup 14 which has a peripheral flange 15 adapted to be sealed to the upper edge of an opening in the top of said container. Mounting cup 14 is provided with a center hub having a vertical wall 16 and a top wall 17. Wall 16 is crimped inwardly to provide an annular shoulder 18. Top wall 17 is provided with a centrally disposed aperture 19. A sealing gasket 20, positioned adjacent the underside of top wall 17, has a centrally disposed opening 21 aligned with aperture 19.

A tubular shell 22 having its open upper end fitting within the hub of mounting cup 14 is provided with an external annular shoulder 23 adjacent its upper end to interlock shell 22 and mounting cup 14 with the upper edge of the shell held in sealing engagement with the underside of gasket 20. The bottom wall 24 of shell 22 is provided with a central aperture 25. A nipple 26 depends from the wall 24 defining the aperture. A siphon tube 28 having its upper end forced over the nipple, extends to a point spaced slightly above the bottom of container 11.

A coiled compression spring 29 is seated in shell 22. The spring 29 exerts a constant force against the bottom of floating valve seat 30 urging it upwardly toward sealing engagement with gasket 20. Floating valve seat 30 is provided centrally with a countersink 31 of a diameter larger than the apertures 19 and 25.

Inasmuch as container 10 may be identical in construction with container 11, corresponding parts are identified by the identical numeral of the prime series.

When containers 10 and 11 are brought together so that the flanges 15 and 15' of mounting cups 14 and 14' are in contact, the top walls 17 and 17' of the mounting cups 14 and 14' do not make contact. To effect transfer of a formulation 32 from container 10 to container 11, a delivery stem 33 is inserted through the apertures 19 and 25 of container 11 into contact with floating valve seat 30. The tubular delivery stem 33 is of length greater than the distance between the countersinks 31 and 31' of the valve seats 30 and 30' and is provided at its top and bottom ends with serrated edges 34 so that the stem will not seal when stem 33 contacts valve seats 30 and 30' and a flow path is provided for ingress and egress of material through the tube while the stem makes contact with and lifts both floating valves 30 and 30' from the closed positions.

The container 10 has a predetermined quantity of formulation 32 in it, for example, polymerization promoter mixed with propellant acting as the liquid carrier. Part of the propellant is present as vapor 35 under a gas pressure such that the formulation 32 can be discharged through valve 12' into delivery stem 33 and then through the valve 12, ultimately to be mixed with liquid 36 which, for example, can be a solution of polymerizable resin, in container 11. After the liquid 32 has been transferred, the gas passes over the same route into container 11 and therein provides the necessary pressure for the ultimate operation of can 11.

Pressure in the container 11 can be solely due to propellant transferred from container 10 or the resultant pressure when the container 11 has its own propellant which is of lower pressure than that of the propellant of container 10.

After transfer, the containers are separated and delivery stem 33 withdrawn from the valve of container 11. As illustrated in FIGURE 2, to dispense the complete formulation 41 in container 11, i.e., a mixture of formulation 32 and liquid 36, a nozzle 37 for dispensing spray having a stem 38 and a serrated edge 39 is inserted into the valve 12. Then when the nozzle 37 is depressed, the spray 40 consisting of mixture will pass out with gas propellant through valve 12.

The invention will be further understood from the following examples which are given by way of illustration and without any intention that the invention be limited thereto.

EXAMPLE I

Components eventually to be sprayed as a paint were mixed using an epoxy resin for the base as follows:

*Dispensing container*

| Paint base: | Grams |
| --- | --- |
| Titanium oxide | 300 |
| Phthalocyanine blue pigment | 4 |
| Epoxy resin (Jones-Dabney Co. Epi-REZ 285) | 647 |
| Solvent: | |
| Xylol | 59.8 |
| Butyl Cellosolve | 65.6 |

A catalyst suspension was prepared as follows:

*Catalyst container*

| Components: | Grams |
| --- | --- |
| Tetraethylene pentamine | 155 |
| Dimerized fatty acid—Amide resin | 30 |
| Butyl Cellosolve | 100 |

202 grams of the paint base was introduced into a conventional container for aerosol dispensing of the liquid medium together with 10 grams of liquid propane, which provides a composition under pressure of about 30 pounds p.s.i. gauge.

10 grams of catalyst mix was introduced into a container adapted with a delivery tip for mass transfer of compounds together with 1 gram of propane and sufficient pressurizing with nitrogen, to provide a composition under pressure of approximately 90 pounds p.s.i. gauge.

EXAMPLE II

A clear acrylic coating composition which will cure at 25° C. in 1½ hours was prepared from the following components:

*Dispensing container*

| Paint base: | Parts |
| --- | --- |
| Methylmethacrylate general purpose molding powder | 8.75 |
| Methylmethacrylate monomer | 16.25 |
| Acetone | 25.00 |
| Dichlorodifluoromethane | 20.00 |
| Trichlorofluoromethane | 30.00 |

*Catalyst container*

| Components: | |
| --- | --- |
| Benzoyl peroxide | 0.20 |
| Dimethylaniline | 0.01 |
| Napthalenethiol | 0.01 |
| Xylene | 4.78 |
| Dichlorodifluoromethane | 4.50 |
| Propane | 0.50 |

EXAMPLE III

A polyester coating composition with a 0.5 hour gel point at 25° C. is formed from 1.5 moles of maleic anhydride and 1.6 moles of diethylene glycol inhibited with 0.02% hydroquinone. 70% of this polyester is mixed with 30% diallyl phthalate.

Dispensing container

Paint base: Parts
- Polyester as described _____ 20.0
- Toluol _____ 30.0
- Methyl isobutyl ketone _____ 30.0
- Isobutane _____ 20.0

Catalyst container

Components:
- 1-hydroxy-cyclohexanol-hydroperoxide-1 _____ 0.80
- 6% cobalt napthenate _____ 0.02
- Mineral spirits _____ 9.18
- Carbon dioxide sufficient to pressure container to 90 p.s.i.g.

EXAMPLE IV

A finished polyester composition exhibiting a fracture-free solid in 30 minutes at 25° C., may be prepared from 1272 parts of diethylene glycol reacted with 1186 parts of maleic anhydride.

Dispensing container

Paint base: Percent, weight
- Diethylene glycol maleate (as above) _____ 18.00
- Methylmethacrylate monomer _____ 3.00
- Styrene monomer _____ 9.00
- Hydroquinone _____ 0.001
- Benzene _____ 30.00
- Vinyl chloride _____ 14.00
- Dichlorodifluoromethane _____ 26.00

Catalyst container

Components:
- Dimethyl phenyl phosphine _____ 0.11
- Methyl ethyl ketone peroxide _____ 0.15
- Dibutyl phthalate _____ 5.00
- Hexane _____ 10.00
- Dichlorodifluoromethane _____ 5.00
- Nitrogen sufficient to pressurize container to 90 p.s.i.g.

EXAMPLE V

A polyurethane adhesive which will cure in 1 to 10 hours, depending upon room temperature, can be prepared as follows:

Dispensing container

Paint base: Percent, weight
- 1 mole trimethylol propane ⎫
- 3 moles tolylene diisocyanate ⎬ "Desmodur TH" 30.0
- Acetone _____ 30.0
- Trichlorofluoromethane _____ 20.0
- Dichlorodifluoromethane _____ 20.0

Catalyst container

Components:
- 3.0 moles adipic acid ⎫
- 4.2 moles hexanetriol ⎬ "Desmophen 900" ____ 12.0
- Propane _____ 8.0

EXAMPLE VI

A urethane foam formulated for a "one shot" rapid dispensing use can be prepared as follows:

Dispensing container

Paint base: Percent, weight
- 2 moles diphenylmethane diisocyanate, 1 mole polypropylene glycol (M.W. 750) _____ 55.00
- Dichlorodifluoromethane _____ 15.75
- Trichlorofluoromethane _____ 29.25

Catalyst container

Components:
- Deionized water _____ 0.77
- 9 mole ethoxylated nonyl phenol syndet _____ 1.54
- N-methylmorpholine _____ 0.55
- Acetone _____ 7.25
- Nitrogen sufficient to pressure container to 90 p.s.i.g.

The foregoing description is given for clearness of understanding only and no unnecessary limitations should be understood therefrom for many modifications will be obvious to those skilled in the art.

We claim:

1. An article of commerce comprising a first pressure-tight container having a single valved opening, said valved opening being operable both for pressure filling through the valve and for dispensing of liquid contents and a second pressure-tight container having a cooperating valve and delivery tip, said delivery tip being of a length greater than the distance between said valves in closed positions when said containers are brought into alignment for insertion of the tip into the valve of said first container for engagement of said tip with both of said valves for simultaneous displacement of said valves into open position for transfer of material from one pressure-tight container to the other, one of said pressure-tight containers having therein a liquid polymerizable material and the other of said pressure-tight containers having therein a composition comprising a polymerization promoter and a carrier for said promoter, at least said pressure-tight container which has the delivery tip having a volatile propellant therein and being maintained at a higher pressure than is maintained in said first container.

2. An article of commerce according to claim 1 wherein said liquid polymerizable material has a volatile propellant associated therewith and said catalyst has associated therewith a carrier for said catalyst and a volatile propellant maintaining a vapor pressure higher than that of the volatile propellant associated with said polymerizable material.

3. An article of commerce according to claim 1 wherein the liquid polymerizable material is an epoxy resin monomer and the catalyst is tetraethylene pentamine.

4. An article of commerce according to claim 1 wherein the liquid polymerizable material is an acrylic resin monomer.

5. An article of commerce according to claim 1 wherein the volatile propellants are hydrocarbon compounds.

6. An article of commerce according to claim 1 wherein the volatile propellants are mixtures of hydrocarbon compound and halogenated alkane having not more than two carobn atoms.

7. An article of commerce according to claim 1 wherein the first pressurized container contains a volatile propellant having a vapor pressure less than 30 p.s.i. at 70° F. and said second pressure container contains a volatile propellant having a vapor pressure in the range between about 40 and 100 p.s.i. gauge at 70° F.

8. The method of aerosol dispensing of polymerizable materials which comprises initially establishing two separate systems at least one of which is under pressure generated by volatile propellant, said systems each being adapted for controlled egress of liquid therefrom at a single point, said controlled egress of liquid of one system having associated therewith a flow director and said controlled egress of the other system being adapted for the dual purpose of egress and ingress of liquid into its system, one system comprising polymerizable material and the other system comprising polymerization promoter in amounts which provide after mixing a predetermined period for polymerization during which a viscosity of less than 30 seconds as measured by a No. 4 Ford Cup will be attained, maintaining one of said systems at a relatively low pressure, bringing the systems together and discharging the contents of the system held under higher pressure through a continuous communication path formed when the flow director simultaneously engages and opens said liquid egress controllers of both pressurized systems into the other system whereby a composite composition is obtained, breaking the continuous communication path after transfer of at least part of the contents of the higher pressure system at the point of liquid egress control in the system containing composite composition and dispensing the composite composition during the predetermined period prior to development of a viscosity in excess of said 30 seconds under the pressure of propellant developed in the accumulator system.

9. The method according to claim 8 wherein the first system comprises epoxy resin in a solution having a viscosity of less than 30 seconds as measured by a No. 4 Ford Cup.

10. The method according to claim 8 wherein the polymerizable material is associated with a volatile propellant having a vapor pressure of less than 40 p.s.i gauge and said second system comprises a catalyst associated with a volatile propellant having a vapor pressure in the range between about 5 and 200 p.s.i. gauge and the composite composition is dispensed under a pressure in the range between about 20 and 100 p.s.i. gauge.

11. The method according to claim 8 wherein the polymerizable material is an acrylic resin monomer having a viscosity less than 30 seconds as measured by a No. 4 Ford Cup and the second system comprises benzoyl peroxide, a liquid carrier for said catalyst and a volatile propellant in amounts sustaining a vapor pressure in the range between about 20 and 100 p.s.i. gauge.

12. The method according to claim 8 wherein the polymerizable material to be dispensed is a urethane resin.

References Cited

UNITED STATES PATENTS

| | | | |
|---|---|---|---|
| 2,070,167 | 2/1937 | Iddings. | |
| 2,524,590 | 10/1950 | Boe | 239—8 X |
| 2,828,892 | 4/1958 | Ward | 141—20 X |
| 3,096,001 | 7/1963 | Boe et al. | 222—135 |
| 3,160,182 | 12/1964 | O'Donnell | 141—20 |
| 3,181,737 | 5/1964 | Chaucer | 222—136 |

OTHER REFERENCES

Reference (A)—Modern Packaging, February 1961—Article by W. Earl Graham on pages 121–123.

RAPHAEL M. LUPO, *Primary Examiner.*